(12) United States Patent
Fujita et al.

(10) Patent No.: US 10,015,410 B2
(45) Date of Patent: Jul. 3, 2018

(54) IMAGE PROCESSING DEVICE AND METHOD, PROGRAM, AND RECORD MEDIUM FOR GENERATING WIDE DYNAMIC RANGE IMAGES

(71) Applicant: MITSUBISHI ELECTRIC CORPORATION, Tokyo (JP)

(72) Inventors: Takeo Fujita, Tokyo (JP); Daisuke Suzuki, Tokyo (JP); Koichi Yamashita, Tokyo (JP); Narihiro Matoba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/541,039

(22) PCT Filed: Oct. 8, 2015

(86) PCT No.: PCT/JP2015/078563
§ 371 (c)(1),
(2) Date: Jun. 30, 2017

(87) PCT Pub. No.: WO2016/113961
PCT Pub. Date: Jul. 21, 2016

(65) Prior Publication Data
US 2017/0374258 A1 Dec. 28, 2017

(30) Foreign Application Priority Data
Jan. 16, 2015 (JP) ................................ 2015-006318

(51) Int. Cl.
*H04N 5/235* (2006.01)
*H04N 9/07* (2006.01)
*H04N 9/73* (2006.01)

(52) U.S. Cl.
CPC ......... *H04N 5/2352* (2013.01); *H04N 5/2351* (2013.01); *H04N 9/07* (2013.01); *H04N 9/735* (2013.01)

(58) Field of Classification Search
CPC ............. H04N 5/2355; H04N 5/23232; H04N 5/2353; H04N 5/2354; H04N 5/2356; H04N 5/353; H04N 5/35581
See application file for complete search history.

(56) References Cited

U.S. PATENT DOCUMENTS

| 2006/0268151 | A1 | 11/2006 | Yamashita |
| 2008/0284872 | A1 | 11/2008 | Asoma |
| 2009/0086061 | A1 | 4/2009 | Asoma |

FOREIGN PATENT DOCUMENTS

| JP | 2003-110932 A | 4/2003 |
| JP | 2003-174582 A | 6/2003 |

(Continued)

OTHER PUBLICATIONS

Machine English Translation of JP 2014-007437 A (Year: 2014).*

*Primary Examiner* — Nelson D. Hernández Hernández
(74) *Attorney, Agent, or Firm* — Birch, Stewart, Kolasch & Birch, LLP

(57) ABSTRACT

In the combination of a wide dynamic range by combining a first image and a second image of different light exposure conditions, pixel values at which cumulative frequency proportions (B) become first and second reference values are generated as first and second index values (Sa, Lb) with regard to the first and second images, and first and second light exposure amounts (ES, EL) are controlled under first and second target conditions that the first and second index values (Sa, Lb) have predetermined relations with first and second target values (Sat, Lbt), respectively. It is possible to (Continued)

shorten a time taken until convergence of the light exposure amount in relation to a change of brightness of a subject.

10 Claims, 12 Drawing Sheets

(56) References Cited

FOREIGN PATENT DOCUMENTS

| | | | |
|---|---|---|---|
| JP | 2005-204196 | A | 7/2005 |
| JP | 2006-333229 | A | 12/2006 |
| JP | 2008-104009 | A | 5/2008 |
| JP | 2008-228058 | A | 9/2008 |
| JP | 2009-88930 | A | 4/2009 |
| JP | 2011-259375 | A | 12/2011 |
| JP | 2014-7437 | A | 1/2014 |
| JP | 2014007437 | A * | 1/2014 |

* cited by examiner

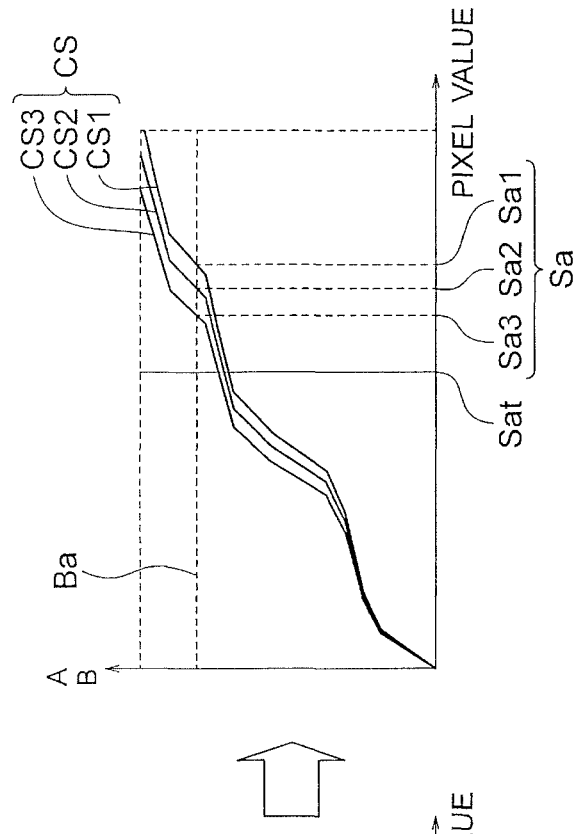
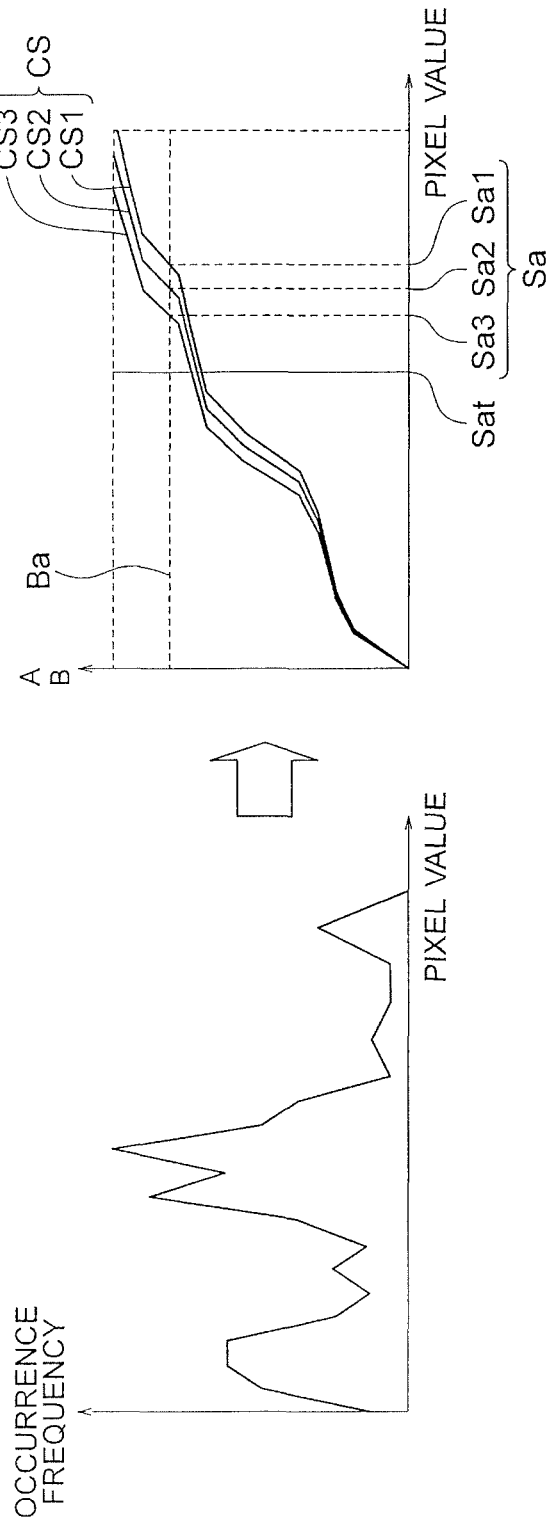

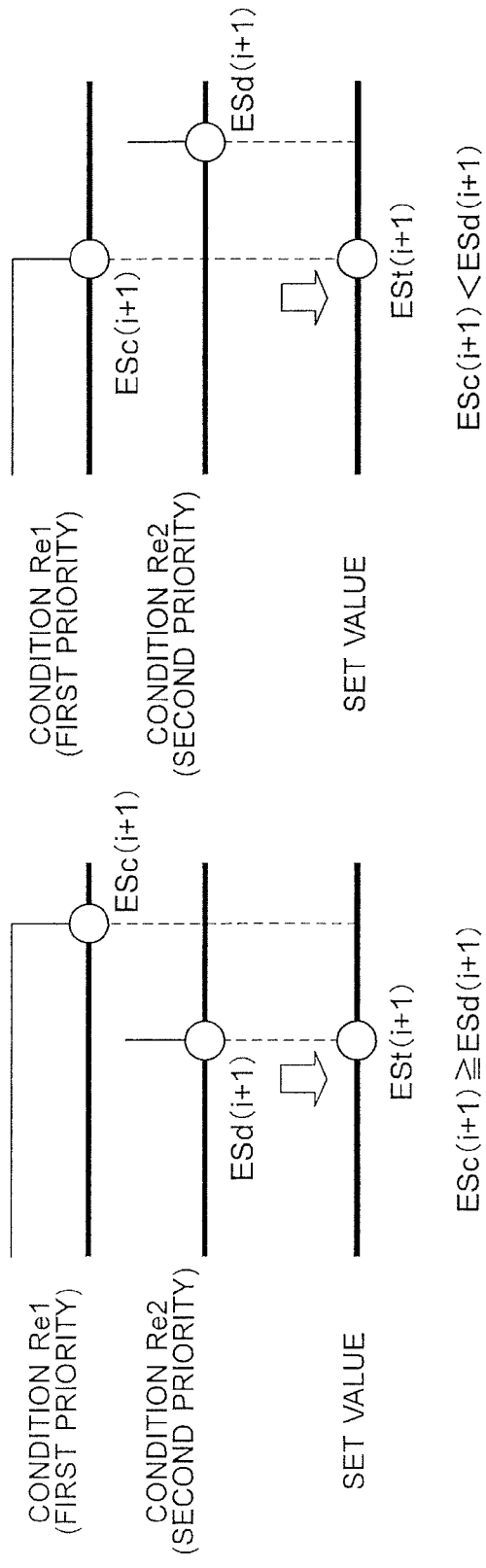

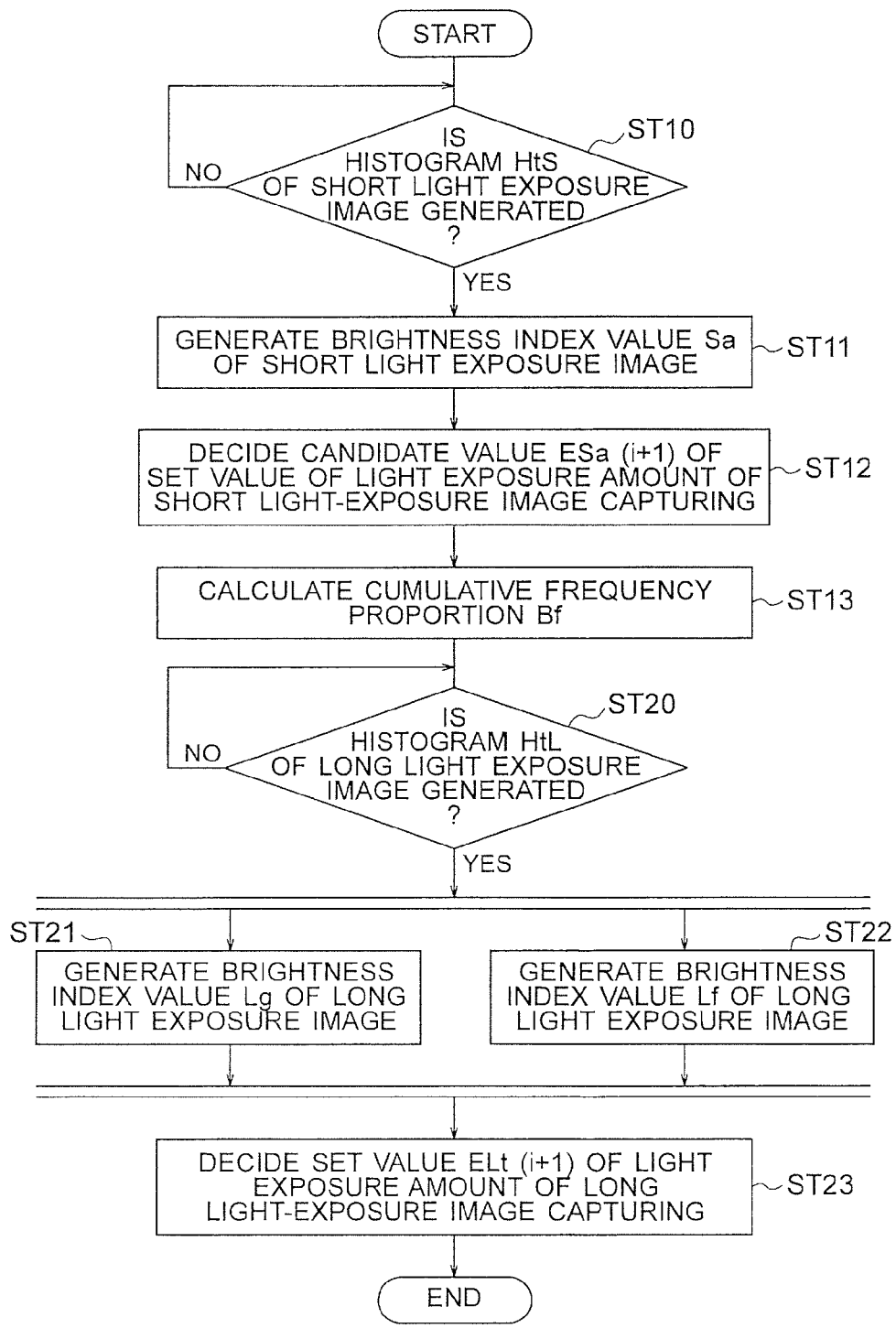

IMAGE PROCESSING DEVICE AND METHOD, PROGRAM, AND RECORD MEDIUM FOR GENERATING WIDE DYNAMIC RANGE IMAGES

TECHNICAL FIELD

The present invention relates to an image processing device and method of an image capturing device that combines images obtained by image capturing in two different light exposure conditions in the image capturing device. The present invention also relates to a program for causing a computer to execute a process in the image processing device and method, and a computer-readable record medium that records the program.

BACKGROUND ART

An image capturing device that generates a composite image of a wide dynamic range by combining a plurality of images having different light exposure times from each other is described in patent reference 1. In the image capturing device described in patent reference 1, a composite image signal is generated from a long light exposure image signal and a short light exposure image signal, light exposure control is performed by using a brightness integrated value in a brightness histogram (brightness distribution) on the composite image signal, and thereby the image quality of a wide dynamic range camera is improved.

PRIOR ART REFERENCE

Patent Reference

PATENT REFERENCE 1: Japanese Patent Application Publication No. 2008-228058 (pp. 5 to 7, FIG. 10)

SUMMARY OF THE INVENTION

Problem to be Solved by the Invention

However, in the above method in which the light exposure control is performed on the basis of the brightness integrated value in the histogram, a change amount of a light exposure amount and a change amount of the brightness integrated value do not have a proportional relation; thus it is necessary to change the light exposure amount in a step-by-step manner while confirming the brightness integrated value for each frame; and there is a problem that it takes a time for the light exposure amount to converge in relation to a change of brightness of a subject.

Means for Solving the Problem

An image processing device of the present invention is an image processing device of an image capturing device that includes an image capturing unit that captures an image by receiving light from a subject, and the image processing device includes:

a control unit that causes the image capturing unit to repeatedly and alternately perform image capturing with a first light exposure amount using a first light exposure time and image capturing with a second light exposure amount using a second light exposure time that is different from and longer than the first light exposure time, and to repeatedly and alternately output a first image generated by the image capturing with the first light exposure amount and a second image generated by the image capturing with the second light exposure amount;

an image combination unit that generates a composite image by combining the first image and the second image; and a pixel value measurement unit that generates a histogram indicating an occurrence frequency of pixels of each pixel value in the first image and another histogram indicating another occurrence frequency of pixels of each pixel value in the second image.

The Control Unit generates a first index value as a pixel value at which a first cumulative frequency proportion obtained by dividing a cumulative frequency of the occurrence frequency of pixels of each pixel value up to the pixel value by a total number of pixels that compose the first image becomes a first reference value in the histogram of the first image, and controls the first light exposure amount so that a first target condition that the first index value has a predetermined relation with a predetermined first target value is satisfied, and generates a second index value as another pixel value at which a second cumulative frequency proportion obtained by dividing a cumulative frequency of the another occurrence frequency of pixels of each pixel value up to the another pixel value by a total number of pixels that compose the second image becomes a second reference value smaller than the first reference value in the another histogram of the second image, and controls the second light exposure amount so that a second target condition that the second index value has a predetermined relation with a predetermined second target value is satisfied.

Effects of the Invention

According to the present invention, the change of the light exposure amount is proportional to a change of an index value generated from a histogram of pixel values; thus the light exposure amount for getting the index value closer to a target value can be calculated from a ratio of the index value and the target value; and the time until the convergence of the light exposure amount can be shortened in relation to the change of brightness of the subject.

BRIEF DESCRIPTION OF THE DRAWINGS

FIGS. 2(a) and 2(b) are diagrams illustrating an example of a histogram and cumulative frequency curves with regard to a short light exposure image.

FIGS. 5(a) and 5(b) are diagrams illustrating an example of a method for deciding a set value from a plurality of candidate values of the set value.

FIG. 7 is a flowchart illustrating operation of a control unit 5 in a second embodiment of the present invention.

MODE FOR CARRYING OUT THE INVENTION

First Embodiment.

Figure 1:
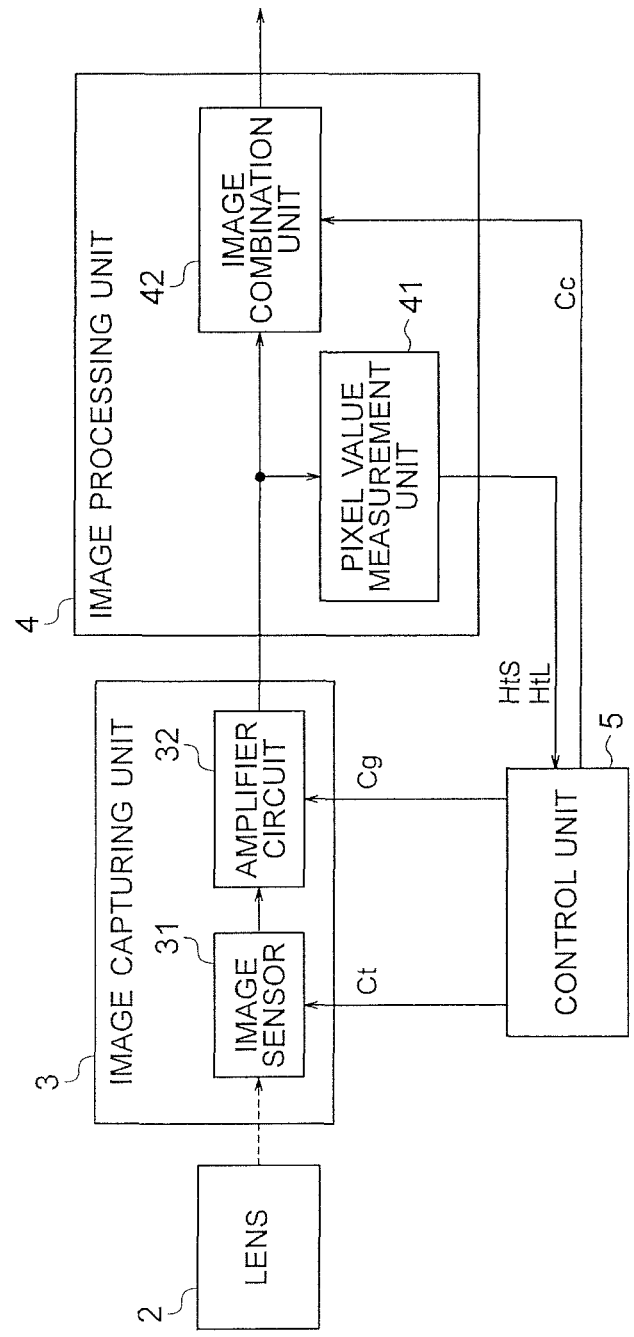
FIG. 1 is a block diagram illustrating an image processing device of a first embodiment of the present invention.

FIG. 1 is a block diagram illustrating a configuration of an image capturing device that includes an image processing device according to a first embodiment of the present invention. The illustrated image capturing device includes a lens 2, an image capturing unit 3, an image processing unit 4, and a control unit 5. Of the above components, the image processing unit 4 and the control unit 5 compose the image processing device.

The image capturing unit 3 includes an image sensor 31 consisting of a CCD element or a CMOS element and an amplifier circuit 32.

The lens 2 directs light from a subject to an imaging surface of the image sensor 31 and forms an optical image on the imaging surface.

The image sensor 31 converts the optical image formed on the imaging surface to electronic data (color image data) and outputs the electronic data. The image capturing unit 3 is capable of changing a light exposure time and a gain, and can adjust brightness of a captured image by changing the light exposure time and the gain.

The light exposure time is changed by changing an electric charge accumulation time of the image sensor 31. The gain is changed by changing an amplification degree of the amplifier circuit 32.

The image capturing unit 3 repeatedly and alternately performs image capturing with a first light exposure amount and image capturing with a second light exposure amount that differs from the first light exposure amount, and repeatedly and alternately outputs a first image generated by the image capturing with the first light exposure amount and a second image generated by the image capturing with the second light exposure amount.

The image capturing with the first light exposure amount is performed with a first light exposure time and a first gain, and the image capturing with the second light exposure amount is performed with a second light exposure time and a second gain. For example, the first light exposure time is shorter than the second light exposure time.

The image capturing that uses a comparatively short first light exposure time is referred to as short light-exposure image capturing, and the image capturing that uses a comparatively long second light exposure time is referred to as long light-exposure image capturing. The short light-exposure image capturing and the long light-exposure image capturing are each performed every other frame alternately. That is, the short light-exposure image capturing is performed in a certain frame, and the long light-exposure image capturing is performed in the next frame.

A frame in which the short light-exposure image capturing is performed is referred to as a short light exposure frame; an image obtained by the short light-exposure image capturing is referred to as a short light exposure image; a frame in which the long light-exposure image capturing is performed is referred to as a long light exposure frame; and an image obtained by the long light-exposure image capturing is referred to as a long light exposure image.

The image processing unit 4 includes a pixel value measurement unit 41 and an image combination unit 42.

The pixel value measurement unit 41 performs various measurements to image data of each frame output from the image capturing unit 3. For example, in each frame, an average value of pixel values is calculated. Moreover, distribution of the pixel values is measured to generate a histogram. The histogram indicates an occurrence frequency of pixels of each pixel value in an image of each frame.

As a result of generating a histogram for each frame, a histogram HtS for the short light exposure image and a histogram HtL for the long light exposure image are obtained.

The image combination unit 42 combines the short light exposure image DS and the long light exposure image DL which are output from the image capturing unit 3 and outputs a composite image D4. Thereby, an image with an enlarged dynamic range can be obtained.

The control unit 5 controls the light exposure time and the gain of the image capturing unit 3 and an image combining ratio of the image combination unit 42 on the basis of the measurement results in the pixel value measurement unit 41.

The light exposure time and the gain are controlled by a light-exposure time control signal Ct and a gain control signal Cg, respectively. The image combining ratio is controlled by a combining ratio control signal Cc.

In the present embodiment, the light exposure amount of the short light-exposure image capturing is controlled on the basis of the histogram HtS of the short light exposure image, and the light exposure amount of the long light-exposure image capturing is controlled on the basis of the histogram HtL of the long light exposure image.

As described above, in a case where the short light-exposure image capturing and the long light-exposure image capturing are performed alternately, the control unit 5 performs, to the image capturing unit 3, setting of a light exposure time TS and setting of a gain GS for the short light-exposure image capturing and setting of a light exposure time TL and setting of a gain GL for the long light-exposure image capturing, every other frame alternately.

As described above, the control unit 5 uses the measurement results of the pixel value measurement unit 41 for the control of light exposure.

The control unit 5 controls the light exposure amount so that blown-out highlights do not occur in a high brightness part of the subject, on the basis of the measurement result of the short light exposure image.

FIG. 2(a) illustrates an example of the histogram HtS generated for the short light exposure image. In FIG. 2(a), the horizontal axis indicates a pixel value P, and the vertical axis indicates an occurrence frequency of pixels having each pixel value.

The control unit 5 calculates a cumulative frequency A by cumulating the occurrence frequency of each pixel value from a low pixel value side to a pixel value in the histogram HtS illustrated in FIG. 2(a). Curves indicating the cumulative frequency A calculated in this way are illustrated in FIG. 2 (b). In FIG. 2(b), the horizontal axis indicates a pixel value P, and the vertical axis indicates the cumulative frequency A up to the pixel value.

The curves illustrated in FIG. 2(b) also indicate a proportion (cumulative frequency proportion) B of the above cumulative frequency A to a total number (number of all pixels) Am of pixels that compose the short light exposure image. The curves illustrated in FIG. 2(b) indicate a cumulative frequency and therefore are referred to as cumulative frequency curves, and indicate a cumulative frequency proportion and therefore are also referred to as cumulative frequency proportion curves.

The control unit 5 measures a pixel value P (B=Ba) at which the cumulative frequency proportion B becomes a predetermined reference value Ba in the cumulative frequency proportion curve of FIG. 2(b), and sets this value as a brightness index value (first index value) Sa. The above reference value Ba is set to 90%, for example. In this example, the short light exposure image corresponds to the "first image" in the claims, and the reference value Ba corresponds to a "first reference value" in the claims.

The three curves CS1, CS2, and CS3 are illustrated as examples of the cumulative frequency proportion curve in FIG. 2 (b), and the brightness index values Sa respectively obtained from the curves are indicated by reference signs Sa1, Sa2, and Sa3.

A target value Sat is set for the brightness index value Sa. The target value Sat is set to a largest possible value within a range in which the blown-out highlights do not occur. When a gradation value is a value from 0 to 255, the target value Sat is set to "200", for example.

The control unit 5 controls the light exposure amount ES (the light exposure time multiplied by the gain) of the short light-exposure image capturing so that the brightness index value Sa gets closer to the target value Sat.

When the brightness index value Sa is made closer to the target value Sat, the light exposure amount ES is not changed by a value corresponding to a difference between the target value Sat and the brightness index value Sa, but changed by a value corresponding to part of the difference between the target value Sat and the index value Sa.

Specifically, a set value ES(i+1) of the light exposure amount in the next short light exposure frame is calculated by the following expression (1), where the index value in a current frame is Sa(i); the target value for the index value is Sat; and the light exposure amount (the product of the light exposure time and the gain) in the current frame is ES(i).

$$ES(i+1)=ES(i)+(ES(i)\times(Sat-Sa(i))/Sa(i))\times Kra \quad (1)$$

Here, Kra is a feedback ratio. The feedback ratio Kra is set to a value within a range from 0 to 1. As the feedback ratio Kra is closer to 0, the change of the light exposure amount can be made slower. Thus, rapid fluctuation of the light exposure amount is suppressed, but it takes time for the index value Sa to converge to the target value Sat. As the feedback ratio Kra is closer to 1, the convergence of the index value Sa to the target value Sat becomes faster, but the light exposure amount is more likely to fluctuate rapidly.

There is a characteristic that the brightness index value Sa generated by the above method is proportional to the light exposure amount ES, and that the change of the brightness index value Sa is proportional to the change of the light exposure amount ES.

For example, it is because, when the light exposure amount ES (the product of the light exposure time and the gain) of the image capturing unit 3 is increased by α %, individual pixel values in the captured image increase by α % uniformly, and thus the index value Sa defined by the pixel value P (B=Ba) at which the proportion B of the cumulative frequency A to the number of all pixels Am becomes a certain value Ba also becomes a value increased by α %.

The light exposure amount ES of the next short light exposure frame can be decided on the basis of a ratio of the difference between the target value Sat and the index value Sa to the index value Sa, by utilizing the proportional relation between the change of the light exposure amount ES and the change of the index value Sa. Thus, the index value Sa can be forced to converge to the target value Sat at a high speed and with high accuracy.

The control unit 5 controls the light exposure amount so that blocked-up shadows do not occur in a low brightness part on the basis of the measurement result of the long light exposure image.

Figure 3A:
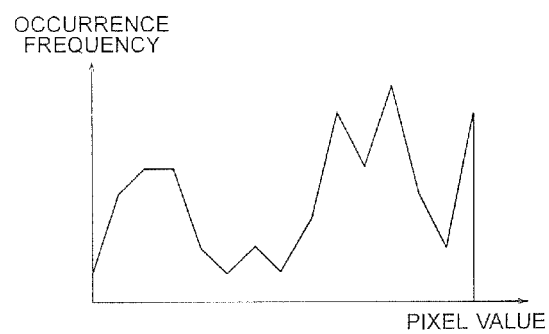
FIGS. 3(a) and 3(b) are diagrams illustrating an example of a histogram and cumulative frequency curves with regard to a long light exposure image.

FIG. 3(a) illustrates an example of the histogram HtL generated for the long light exposure image.

Figure 3B:
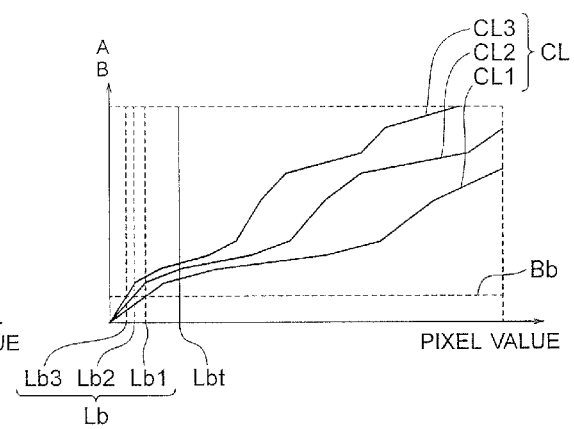

The control unit 5 calculates the cumulative frequency A by cumulating the occurrence frequency of each pixel value from the low pixel value side to a pixel value in the histogram HtL illustrated in FIG. 3(a). Curves indicating the cumulative frequency A calculated in this way are illustrated in FIG. 3(b). The curves illustrated in FIG. 3(b) also indicate the proportion (cumulative frequency proportion) B of the above cumulative frequency A to the total number (number of all pixels) Am of pixels that compose the long light exposure image. The curves CL illustrated in FIG. 3(b) indicate the cumulative frequency and therefore are referred to as the cumulative frequency curves, and indicate the cumulative frequency proportion and therefore are also referred to as the cumulative frequency proportion curves.

The control unit 5 measures a pixel value P (B=Bb) at which the cumulative frequency proportion B becomes a predetermined reference value Bb in the cumulative frequency proportion curve of FIG. 3(b), and sets this value as a brightness index value (second index value) Lb. The above reference value Bb is set to 5%, for example. In this example, the long light exposure image corresponds to the "second image" in the claims, and the reference value Bb corresponds to a "second reference value" in the claims.

The three curves CL1, CL2, and CL3 are illustrated as examples of the cumulative frequency proportion curve in FIG. 3 (b), and the brightness index values Lb respectively obtained from the curves are indicated by reference signs Lb1, Lb2, and Lb3.

A target value Lbt is set for the brightness index value Lb. The target value Lbt is set to a smallest possible value within a range in which the blocked-up shadows do not occur. When the gradation value is a value from 0 to 255, the target value Lbt is set to "30", for example.

The control unit 5 controls the light exposure amount EL (the light exposure time multiplied by the gain) of the long light-exposure image capturing so that the brightness index value Lb gets closer to the target value Lbt.

In the same way as described with regard to the light exposure control of the short light-exposure image capturing, when the brightness index value Lb is made closer to the target value Lbt, the light exposure amount EL is not changed by a value corresponding to the difference between the target value Lbt and the brightness index value Lb, but changed by a value corresponding to part of the difference between the target value Lbt and the index value Lb.

Specifically, a set value EL(i+1) of the light exposure amount in the next long light exposure frame is calculated by the following expression (2), where the index value in a current frame is Lb(i); the target value for the index value is Lbt; and the light exposure amount (the product of the light exposure time and the gain) in the current frame is EL(i).

$$EL(i+1)=EL(i)+(EL(i)\times(Lbt-Lb(i))/Lb(i))\times Krb \quad (2)$$

Here, Krb is a feedback ratio. The feedback ratio Krb is set to a value within the range from 0 to 1. As the feedback ratio Krb is closer to 0, the change of the light exposure amount can be made slower. Thus, rapid fluctuation of the light exposure amount is suppressed, but it takes time for the index value Lb to converge to the target value Lbt. As the feedback ratio Krb is closer to 1, the convergence of the index value Lb to the target value Lbt becomes faster, but the light exposure amount is more likely to fluctuate rapidly.

The feedback ratio Krb may be the same value as or a different value from the feedback ratio Kra of expression (1).

There is a characteristic that the brightness index value Lb generated by the above method is proportional to the light exposure amount EL, and that the change of the brightness index value Lb is proportional to the change of the light exposure amount EL.

For example, it is because, when the light exposure amount EL (the product of the light exposure time and the gain) of the image capturing unit 3 is increased by α %, individual pixel values in the captured image increase by α % uniformly, and thus the index value Lb defined by the pixel value P (B=Bb) at which the proportion B of the cumulative frequency A to the number of all pixels Am becomes a certain value Bb also becomes a value increased by α %.

The light exposure amount EL of the next long light exposure frame can be decided on the basis of a ratio of the difference between the target value Lbt and the index value Lb to the index value Lb, by utilizing the proportional relation between the change of the light exposure amount EL and the change of the index value Lb. Thus, the index value Lb can be forced to converge to the target value Lbt at a high speed and with high accuracy.

In the example described with reference to FIGS. 2(a) to 3(b) in the above, one index value is generated from the cumulative frequency proportion curve with regard to each of the short light exposure image and the long light exposure image, and the light exposure control is performed from the relation between the one index value and the target value set in advance for the index value. Instead of doing like this, two or more index values may be generated from the cumulative frequency proportion curve with respect to either one or both of the short light exposure image and the long light exposure image, to perform the light exposure control from the relation between the two or more index values and the target values set in advance for the index values.

In the following, with regard to the short light exposure image, a case in which the number of index values generated from its cumulative frequency proportion curve is two will be described.

Figure 4:
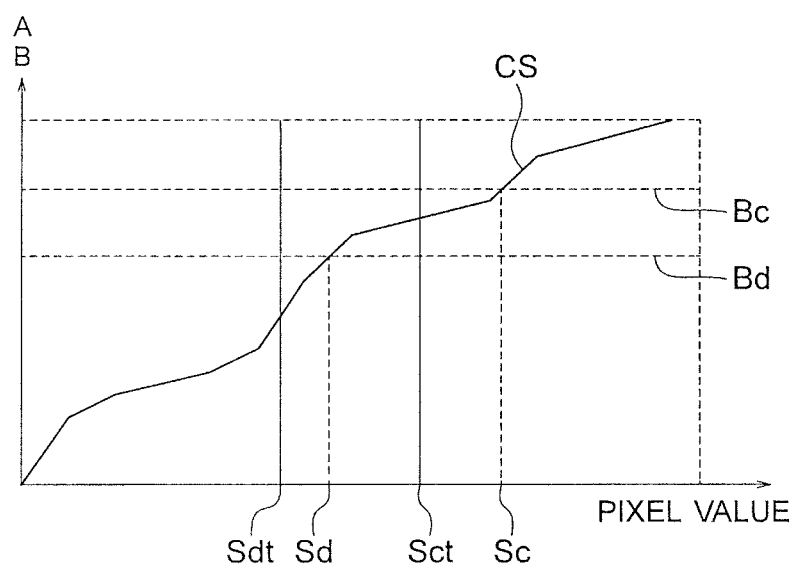
FIG. 4 is a diagram illustrating an example in which a plurality of index values are generated from the cumulative frequency curve with regard to the short light exposure image.

In the following example, the generated two index values Sc and Sd are pixel values P (B=Bc) and P (B=Bd) at which the cumulative frequency proportion B reaches two values Bc and Bd that differ from each other, as illustrated in FIG. 4.

In this case, a set value ESt of the light exposure amount is determined as below.

First, candidate values ESc and ESd of the set value of the light exposure amount are calculated from the index values Sc and Sd and target values Sct and Sdt, for individual conditions.

The index values in a current frame are Sc(i) and Sd(i); the target values for the index values are Sct and Sdt; the light exposure amount (the product of the light exposure time and the gain) in the current frame is ES(i); and the candidate values ESc(i+1) and ESd(i+1) of the set value of the light exposure amount in the next short light exposure frame are calculated by the following expressions (3) and (4).

$$ESc(i+1)=ES(i)+\{(ES(i)\times(Sct-Sc(i))/Sc(i))\}\times Krc \quad (3)$$

$$ESd(i+1)=ES(i)+\{(ES(i)\times(Sdt-Sd(i))/Sd(i))\}\times Krd \quad (4)$$

In expressions (3) and (4), Krc and Krd are feedback ratios. The feedback ratios Krc and Krd are both set to a value within the range from 0 to 1. The feedback ratios Krc and Krd may be the same as each other, and may also differ from each other.

As described above, the two candidate values ESc(i+1) and ESd(i+1) are calculated for the set value of the light exposure amount in the next short light exposure frame, by providing the two index values and the two target values. It is necessary to determine one set value ESt(i+1) from these values. For that purpose, with respect to both of the index values Sc and Sd, the control is not performed targeting "the index value is equal to the target value", but performed so that a target condition that "the index value having a predetermined relation with the target value" is satisfied. As examples of the "predetermined relation with the target value, "equal to the target value", "equal to or larger than the target value", or "equal to or smaller than the target value" are given. Furthermore, a priority order is determined for each target, and the control is performed.

As described above, the target conditions are determined with regard to a plurality of index values respectively, and the control is performed so that all the index values satisfy the target conditions. This makes it possible to achieve the control of the light exposure amount based on the plurality of index values.

For example, here, satisfying that the index value Sc becomes equal to or smaller than the target value Sct, that is, $$Sc(i+1)\leq Sct \quad (Ra1)$$

is a first priority target, and a condition that is to be satisfied by the set value ESt(i+1) for that purpose is set as a first priority condition.

Moreover, satisfying that the index value Sd becomes equal to the target value Sdt, that is $$Sd(i+1)=Sdt \quad (Ra2)$$

is a second priority target, and a condition that is to be satisfied by the set value ESt(i+1) for that purpose is set as a second priority condition.

The first priority condition is expressed by the following expression (Re1).

$$ESt(i+1)\leq ESc(i+1) \quad (Re1)$$

The second priority condition is expressed by the following expression (Re2).

$$ESt(i+1)=ESd(i+1) \quad (Re2)$$

As illustrated in FIG. 5(a),
if $$ESc(i+1) \geq ESd(i+1) \tag{Re3}$$

$$ESt(i+1) = ESd(i+1) \tag{Re4}$$

satisfies both of the first priority condition (Re1) and the second priority condition (Re2), and thus ESt(i+1) expressed by expression (Re4) is set as the set value of the light exposure amount of the next short light exposure frame.

As illustrated in FIG. 5(b),
if $$ESc(i+1) < ESd(i+1) \tag{Re6}$$

a value of ESt(i+1) that satisfies the first priority condition (Re1) and the second priority condition (Re2) at the same time does not exist, and thus $$ESt(i+1) = ESc(i+1) \tag{Re7}$$

which is the value that satisfies the first priority condition (Re1) and is the closest to the value satisfying the second priority condition (Re2), is set as the set value.

In the above example, the control is performed targeting "the index value becomes equal to or smaller than the target value" with respect to one of the index values, and the control is performed targeting "the index value becomes equal to the target value" with respect to the other.

However, as described above, the present invention is not limited thereto, but it is possible to determine the target condition for each of the index values, to determine the priority order for each target condition further and to perform the control so that each target condition is satisfied in the order of the priority order.

For example, the control may be performed under a condition that the plurality of index values become equal to or smaller than the target values. More specifically, the pixel value at which the proportion of the cumulative frequency to the number of all pixels becomes 90% is set as a first index value; the pixel value at which the proportion of the cumulative frequency to the number of all pixels becomes 80% is set as a second index value; and the control may be performed by using the target values for these index values as upper limits, that is, so that the index values become equal to or smaller than the target values.

As the short light exposure image used in the generation of the composite image of the wide dynamic range, it is necessary to generate an image with entire pixel values as large as possible and amplitude of pixel value signals (a range of fluctuation of the pixel values) as large as possible within the range in which the blown-out highlights do not occur. By performing the above control, an image capturing condition under which the blown-out highlights do not occur can be set with higher accuracy.

In the long light-exposure image capturing as well, an image capturing condition under which the blocked-up shadows do not occur can be set with high accuracy in the same way.

In the example described above with reference to FIGS. 4 to 5(b), the plurality of index values are generated for one image, and the light exposure control is performed so that the plurality of index values satisfy the target conditions respectively. In the following, a method in which the light exposure control using the plurality of index values in the same way as described with reference to FIGS. 4 to 5(b) and a restriction is put on a light exposure amount ratio RLS will be described below. Here, the light exposure amount ratio RLS is defined as a ratio of the light exposure amount EL in the long light-exposure image capturing to the light exposure amount ES in the short light-exposure image capturing.

If the light exposure amount ratio RLS is too large, the reproducibility of contrast deteriorates in an intermediate brightness range between the brightness range of the best reproducibility of contrast in the long light exposure image and the brightness range of the best reproducibility of contrast in the short light exposure image, and hence the image quality of the composite image deteriorates in some cases, however such deterioration can be prevented by this control.

In order to put the restriction on the light exposure amount ratio RLS, the same value is used as the cumulative frequency proportion used to decide the brightness index value from the cumulative frequency proportion curve of the short light exposure image and the cumulative frequency proportion used to decide the brightness index value from the cumulative frequency proportion curve of the long light exposure image.

Figure 6A:
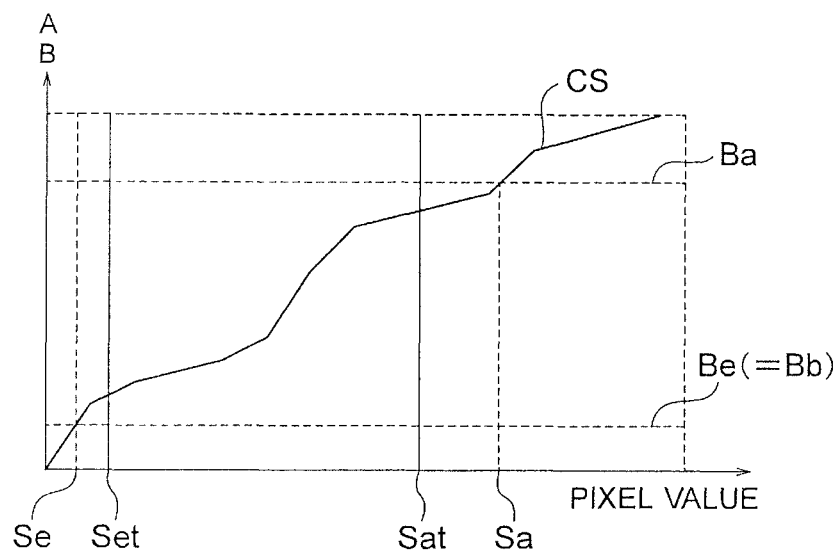
FIGS. 6(a) and 6(b) are diagrams illustrating an example of a method for generating index values from the cumulative frequency curves of the short light exposure image and the long light exposure image, when control is performed by putting a restriction on a light exposure amount ratio.
Figure 6B:
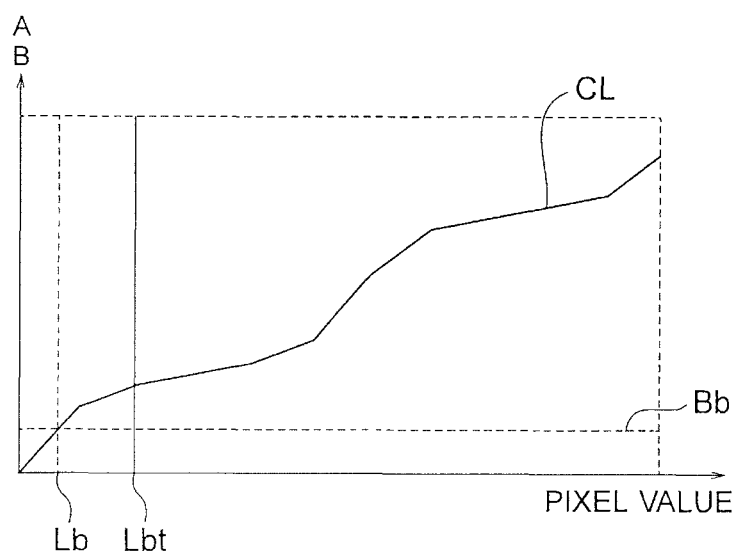

For example, when the cumulative frequency proportion used to decide the brightness index value (second brightness index value) Lb from the cumulative frequency proportion curve of the long light exposure image is Bb as illustrated in FIG. 6(b), a pixel value P(B=Be) that reaches the cumulative frequency proportion Be (=Bb) that is equal to the above cumulative frequency proportion Bb is set as a brightness index value (third brightness index value) Se of the short light exposure image in the cumulative frequency proportion curve of the short light exposure image as illustrated in FIG. 6(a).

The above cumulative frequency proportion Bb is 5%, for example. In this example, the cumulative frequency proportion Bb corresponds to the "second reference value" in the claims, and the cumulative frequency proportion Be corresponds to a "third reference value" in the claims.

Then, target values Set and Lbt are set so that a ratio of the target value Lbt to the target value Set becomes equal to or smaller than an upper limit value of the light exposure amount ratio RLS.

For example, when the restriction, 16 times at the maximum, is put on the light exposure amount ratio RLS, the target value Set of the above index value Se is set equal to or larger than a value obtained by multiplying the target value Lbt by $\frac{1}{16}$ which is the inverse of the upper limit value of the light exposure amount ratio RLS. As an example, when the target value Lbt is "32", the target value Set is set equal to or larger than "2".

With regard to the long light-exposure image capturing, the light exposure control is performed so that the index value Lb generated as described above has a predetermined relation with the target value Lbt.

With regard to the short light-exposure image capturing, the light exposure control is performed so that the index value Se generated as described above has a predetermined relation with the target value Set.

With regard to the short light-exposure image capturing, the same index value Sa as described in the first embodiment is further generated, and the light exposure control is performed so that the index value Sa has a predetermined relation with a predetermined target value Sat for the index value.

With regard to the short light exposure image, decision of the set value of the light exposure amount which uses the two index values Sa and Se may be performed as described with reference to FIGS. 5(a) and 5(b).

In order to prevent the blown-out highlights in the short light exposure image, the pixel value at which the cumulative frequency proportion becomes a large value Ba (for example 90%) is set as the index value Sa, and the target value Sat is set for this, in the same way as the first embodiment. In addition to this, the pixel value at which the cumulative frequency proportion becomes the small value Be (for example, 5%) is measured and set as a second index value Se, the target value Set for this is set to a value associated with the target value for the pixel value of the same cumulative frequency proportion for the long light exposure image, and thereby the restriction can be put on the light exposure amount ratio RLS.

In a case where the control in which the restriction is put on the light exposure amount ratio RLS is performed, the index values Se and Lb and the target values Set and Lbt are small values; thus the fluctuation of the pixel value due to noise has a great influence; and there is a possibility that the control becomes unstable. In order to prevent this, a feedback ratio is set to stabilize the process. Specifically, index values Se' (i+1) and Lb' (i+1) referred to for the control of the light exposure amount are updated for each frame by the following expression (5) and expression (6), by the index values Se(i) and Lb(i) measured in an immediately preceding frame. The immediately preceding frame mentioned here means an immediately preceding short light exposure frame with respect to the short light exposure image, and means an immediately preceding long light exposure frame with respect to the long light exposure image.

$$Se'(i+1)=Se'(i)+(Se'(i)-Se(i))\times Kre' \quad (5)$$

$$Lb'(i+1)=Lb'(i)+(Lb'(i)-Lb(i))\times Krb' \quad (6)$$

Kre' and Krb' are feedback ratios in expression (5) and expression (6). The feedback ratios Kre' and Krb' are set to values within the range from 0 to 1. As the value of the feedback ratio Kre' becomes smaller, the fluctuation of the index value Se' (i+1) due to the noise becomes more gradual, but as a demerit it takes time for the index value Se' (i+1) to converge. In the same way, as the value of the feedback ratio Krb' becomes smaller, the fluctuation of the index value Lb' (i+1) due to the noise becomes more gradual, but as a demerit it takes time for the index value Lb' (i+1) to converge.

Hence, an optimal value needs to be set according to the characteristics of the system. By setting the feedback ratios to suppress sudden change of the index values in this manner, it is possible to suppress the influence of the noise and to obtain stable index values, so that the control of the light exposure amount can be stabilized.

Instead of deciding the index values referred to for the control of the light exposure amount by the above expression (5) and expression (6), the index values measured for respective frames may be averaged to stabilize the process. In this case, the calculation of the index value based on the cumulative frequency proportion curve generated for each frame is performed in the same way as the method described in the first embodiment, and the index values of a predetermined number of frames (for example, 5 frames) from the newest one are stored in a memory. The index value of the immediately preceding frame is not referred to as the index value, but a value obtained by averaging the index values of a plurality of frames is referred to. This makes it possible to suppress the influence of noise and to refer to a stable index value.

As described above, the pixel value reaching the same proportion Be (=Bb=5%) as the cumulative frequency proportion (Bb=5%) used for the decision of the brightness index value Lb for the long light exposure image is used as the brightness index value Se for the short light exposure image; the target value Set of the index value Se is set equal to or larger than a value (=2) obtained by multiplying the target value Lbt (=32) set for the long light exposure image by $\frac{1}{16}$ which is the inverse of the upper limit value of the light exposure amount ratio RLS; and thereby the restriction can be put on the light exposure amount ratio RLS.

This can avoid the problem that the reproducibility of the contrast deteriorates in the intermediate brightness range between the brightness range of the best reproducibility of the contrast in the long light exposure image and the brightness range of the best reproducibility of the contrast in the short light exposure image, and thereby deterioration of the image quality of the composite image can be prevented.

Although the first embodiment has described a case in which the short light exposure image of a certain frame and the long light exposure image of the frame following it are combined, the long light exposure image of a certain frame and the short light exposure image of the frame following it may be combined.

Second Embodiment.

In the example described with reference to FIGS. 6(a) and 6(b), the pixel value reaching the same proportion Be (=Bb=5%) as the cumulative frequency proportion Bb (=5%) used for the decision of the brightness index value Lb of the long light exposure image is used as the brightness index value Se of the short light exposure image, in order to put the restriction on the light exposure amount ratio.

In a second embodiment described below, from the cumulative frequency proportion curve of one (first image) of the short light exposure image and the long light exposure image, a cumulative frequency proportion (Bf) used for the generation of the brightness index value of the other (second image) of the short light exposure image and the long light exposure image is decided, and the light exposure control for the image capturing of the other of the short light exposure image and the long light exposure image is performed by using the decided cumulative frequency proportion.

First, a method for deciding the cumulative frequency proportion (Bf) used for the generation of the brightness index value of the long light exposure image from the cumulative frequency proportion curve of the short light exposure image and performing the light exposure control of the long light-exposure image capturing by using the decided cumulative frequency proportion will be described with reference to FIG. 7 and FIGS. 8(a) and 8(b).

Referring to FIG. 7, the control unit 5 waits for the histogram HtS of the short light exposure image to be generated (ST10). An example of the cumulative frequency proportion curve CS corresponding to the generated histogram HtS is illustrated in FIG. 8(a).

The pixel value P (B=Ba) at which the cumulative frequency proportion B becomes a predetermined reference value Ba is calculated as the brightness index value Sa, from the cumulative frequency proportion curve CS corresponding to the histogram HtS (ST11). In this example, this reference value Ba corresponds to the "first reference value" in the claims.

Thereafter, a candidate value ESa(i+1) of the set value of the light exposure amount of the short light-exposure image capturing in the next short light exposure frame is decided on the basis of the index value Sa and the predetermined target value Sat for the index value Sa (ST12).

Further, the proportion (cumulative frequency proportion) Bf (=Af/Am) of a cumulative frequency Af from a smaller pixel value to a predetermined pixel value Sfs to the number of all pixels Am is calculated on the basis of the cumulative frequency proportion curve CS of the short light exposure image (ST13). In this example, this cumulative frequency proportion Bf corresponds to the "third reference value" in the claims.

Thereafter, the histogram HtL of the long light exposure image is waited to be generated (ST20).

Figure 8A:
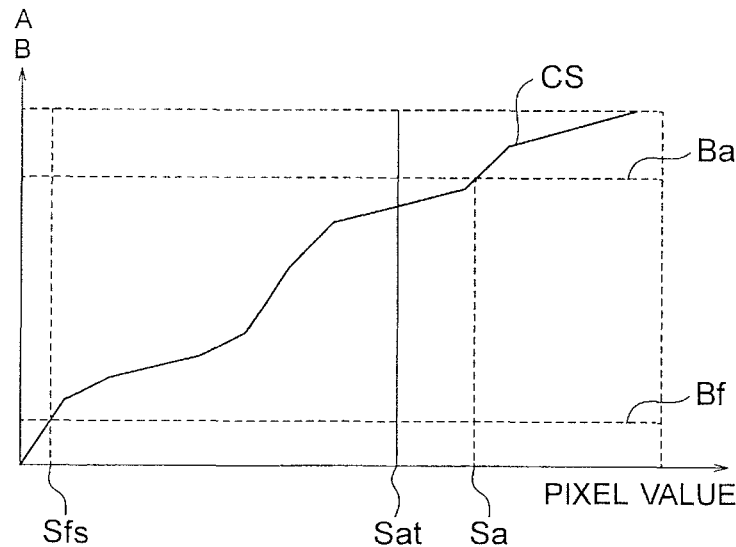
FIGS. 8(a) and 8(b) are diagrams illustrating an example of a method for generating index values from the cumulative frequency curves of the short light exposure image and the long light exposure image, when the control is performed by putting a restriction on the light exposure amount ratio, in the second embodiment.
Figure 8B:
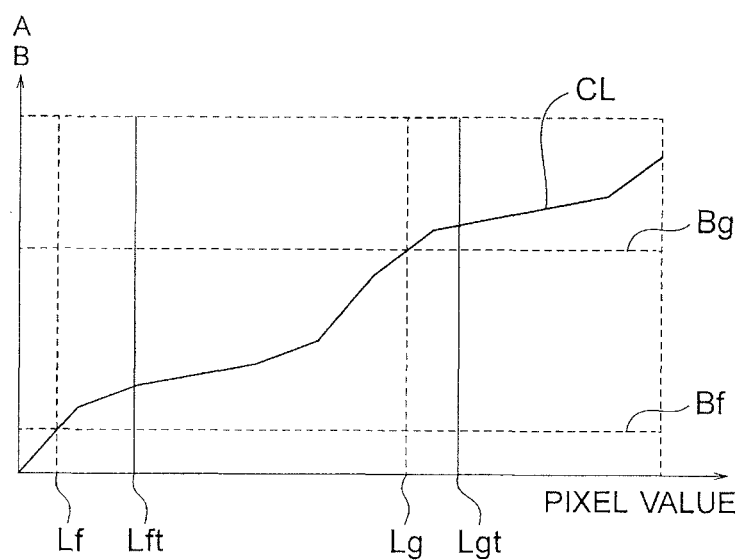

An example of the cumulative frequency proportion curve CL corresponding to the generated histogram HtL is illustrated in FIG. 8(b).

A pixel value at which the cumulative frequency proportion B becomes a predetermined reference value Bg is calculated as an index value Lg, from the cumulative frequency proportion curve CL corresponding to the histogram HtL (ST21).

In addition to this, a pixel value P (B=Bf) at which the cumulative frequency proportion B becomes equal to the cumulative frequency proportion Bf calculated in step ST13 is also calculated as an index value Lf (ST22). As described above, the reference value Bf in this example not only corresponds to the "third reference value" in the claims, but also corresponds to the "second reference value".

Next, a set value ELt(i+1) of the light exposure amount of the long light-exposure image capturing in the next long light exposure frame is decided on the basis of the index values Lg and Lf calculated in steps ST21 and ST22 and predetermined target values Lgt and Lft for the index values (ST23).

The decision of the set value of the light exposure amount by using the two index values Lf and Lg may be performed in the same way as described with reference to FIGS. 4 to 5 (b).

Here, a ratio between the predetermined pixel value Sfs used in step ST13 and the target value Lft (used in step ST23) for the index value Lf calculated in step ST22 are decided according to the light exposure amount ratio RLS. For example, when the restriction, 16 times at the maximum, is put on the light exposure amount ratio RLS, the target value Lft may be set equal to or smaller than 16 times the predetermined pixel value Sfs.

As described above, first, from the histogram of the short light exposure image, the index value (Sa) used for the light exposure control of the short light exposure image is generated, and the cumulative frequency proportion (Bf) used for the generation of the index value (Lf) used for the light exposure control of the long light exposure image is decided, and thereby the index value (Sa) used for the light exposure control of the short light exposure image and the pixel value (Sfs) for putting the restriction on the light exposure amount ratio can be set individually. Hence, the target value (Sat) of the index value used for the light exposure control of the short light exposure image can be set to a large value. Thus, more stable control of the light exposure amount can be performed.

In the above, there has been described a case in which the short light-exposure image capturing is performed in advance; the cumulative frequency proportion used for the generation of the brightness index value of the long light exposure image is decided from the histogram for the short light exposure image; and the brightness index value for the long light exposure image is generated by using the decided cumulative frequency proportion; and the light exposure amount of the long light-exposure image capturing is decided by using the generated index value. Contrary to the above, it is also possible to decide the cumulative frequency proportion used for the generation of the brightness index value of the short light exposure image from the histogram for the long light-exposure image capturing in advance, to generate the brightness index value for the short light exposure image by using the decided cumulative frequency proportion, and to decide the light exposure amount of the short light-exposure image capturing by using the generated index value.

In the following, a process method in this case will be described with reference to FIG. 9 and FIGS. 10(a) and 10(b).

Figure 9:
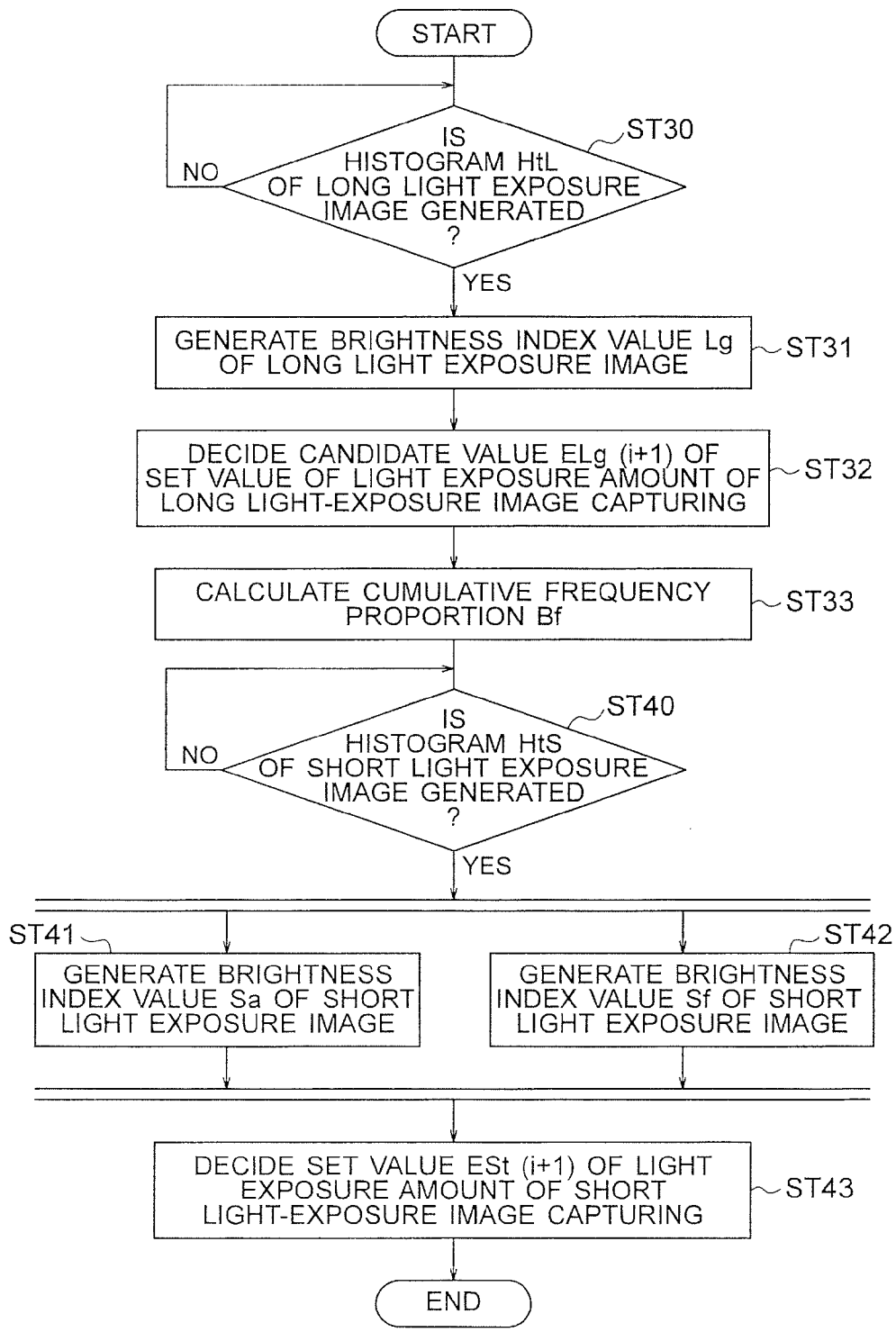
FIG. 9 is a flowchart illustrating operation of the control unit 5 in a variant example of the second embodiment.

Referring to FIG. 9, the control unit 5 waits for the histogram HtL of the long light exposure image to be generated (ST30). An example of the cumulative frequency proportion curve CL corresponding to the generated histogram HtL is illustrated in FIG. 10(b).

The pixel value P (B=Bg) at which the cumulative frequency proportion B becomes the predetermined reference value Bg is calculated as the brightness index value Lg, from the cumulative frequency proportion curve CL corresponding to the histogram HtL (ST31). In this example, this reference value Bg corresponds to the "first reference value" in the claims.

Thereafter, a candidate value ELg(i+1) of the set value of the light exposure amount of the long light-exposure image capturing in the next long light exposure frame is decided on the basis of the index value Lg and the predetermined target value Lgt for the index value Lg (ST32).

Further, the proportion (the cumulative frequency proportion) Bf (=Af/Am) of a cumulative frequency Af from a smaller pixel value to a predetermined pixel value Lfs to the number of all pixels Am is calculated on the basis of the cumulative frequency proportion curve CL of the long light exposure image (ST33). In this example, this cumulative frequency proportion Bf corresponds to the "third reference value" in the claims.

Thereafter, the histogram HtS of the short light exposure image is waited to be generated (ST40).

Figure 10A:
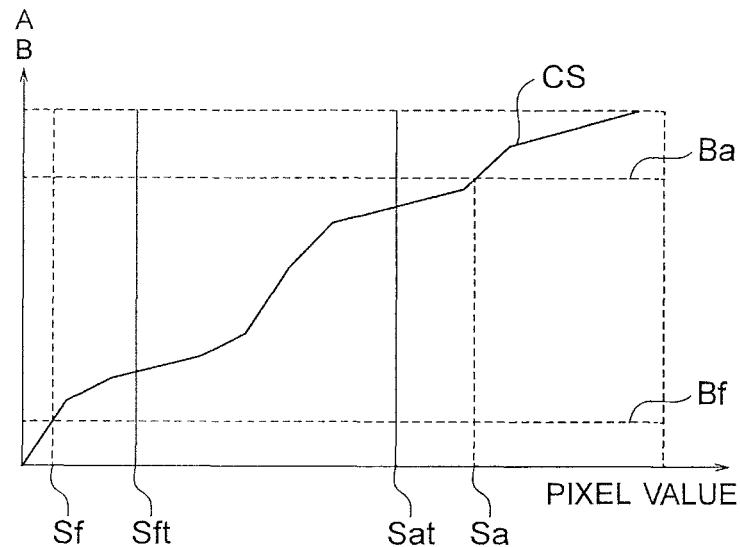
FIGS. 10(a) and 10(b) are diagrams illustrating an example of a method for generating index values from the cumulative frequency curves of the short light exposure image and the long light exposure image, when the control is performed by putting a restriction on the light exposure amount ratio, in the variant example of the second embodiment.

An example of the cumulative frequency proportion curve CS corresponding to the generated histogram HtS is illustrated in FIG. 10(a).

The pixel value at which the cumulative frequency proportion B becomes the predetermined reference value Ba is calculated as the index value Sa, from the cumulative frequency proportion curve CS corresponding to the histogram HtS (ST41).

In addition to this, a pixel value P (B=Bf) at which the cumulative frequency proportion B becomes equal to the cumulative frequency proportion Bf calculated in step ST33 is also calculated as an index value Sf (ST42). As described above, the reference value Bf in this example not only corresponds to the "third reference value" in the claims, but also corresponds to the "second reference value".

Next, a set value ESt(i+1) of the light exposure amount of the short light-exposure image capturing in the next short light exposure frame is decided on the basis of the index values Sa and Sf calculated in steps ST41 and ST42 and the predetermined target values Sat and Sft for the index values (ST43).

The decision of the set value of the light exposure amount by using the two index values Sa and Sf may be performed in the same way as described with reference to FIGS. 4 to 5 (b).

Here, a ratio between the predetermined pixel value Lfs used in step ST33 and the target value Sft (used in step ST43) for the index value Sf calculated in step ST42 are decided according to the light exposure amount ratio RLS. For example, when the restriction, 16 times at the maximum, is put on the light exposure amount ratio RLS, the target value Sft may be set equal to or larger than $\frac{1}{16}$ times the predetermined pixel value Lfs.

As described above, first, the index value (Lg) used for the light exposure control of the long light exposure image is generated from the histogram of the long light exposure image; the cumulative frequency proportion (Bf) used for the generation of the index value (Sf) used in the light exposure control of the short light exposure image is decided; and thereby the index value (Lg) used for the light exposure control of the long light exposure image and the pixel value (Lfs) for putting the restriction on the light exposure amount ratio can be set individually. Hence, the target value (Lgt) of the index value used for the light exposure control of the long light exposure image can be set to a large value. Thus, more stable control of the light exposure amount can be performed.

Figure 10B:
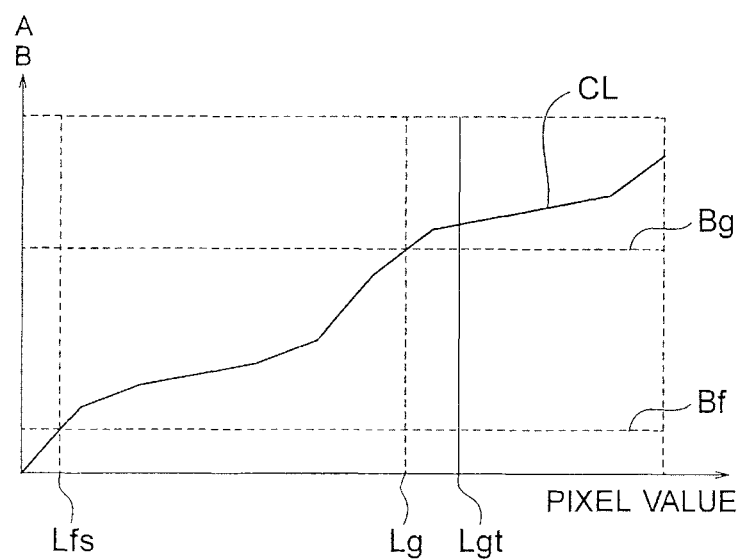

To summarize the above, the cumulative frequency proportion (Bf (FIG. 8(a), FIG. 10(b))) up to the predetermined pixel value (Sfs, Lfs) may be calculated as the third reference value from the histogram of the first image obtained as a result of the image capturing with the first light exposure amount (one of the short light-exposure image capturing and the long light-exposure image capturing); the above third reference value may be used as the second reference value (Bf (FIG. 8(b), FIG. 10(a))) when the second index value (Lf, Sf) is generated from the histogram of the second image obtained as a result of the image capturing with the second light exposure amount (the other of the short light-exposure image capturing and the long light-exposure image capturing) performed subsequent to the image capturing with the first light exposure amount; and the second target value (Lft, Sft) may be determined so that a ratio of a larger one to a smaller one of the predetermined pixel value (Sfs, Lfs) and the second target value (Lft, Sft) is equal to or smaller than an upper limit value (allowable upper limit value) of a ratio of a larger one to a smaller one of the first light exposure amount and the second light exposure amount.

Third Embodiment.

In the first embodiment and the second embodiment, adjustment for the brightness of the image is performed by setting the light exposure amount. In the third embodiment, correction of colorfulness of the image is performed along with the setting of the light exposure amount.

When the short light exposure image and the long light exposure image are combined to generate the wide dynamic range composite image, the colorfulness of the subject fluctuates with this combining, in some cases. For example, in a high brightness part of the combined image, the short light exposure image of low brightness and the long light exposure image in which the blown-out highlights occur are combined, and thus the colorfulness of the image decreases.

To prevent this, the colorfulness of the composite image is corrected according to a ratio of a pixel value corresponding to a certain cumulative frequency proportion in the histogram obtained from the short light exposure image to a pixel value corresponding to the same cumulative frequency proportion in the histogram obtained from the long light exposure image. As the above ratio becomes larger, the intensity of the correction is made larger.

Figure 11:
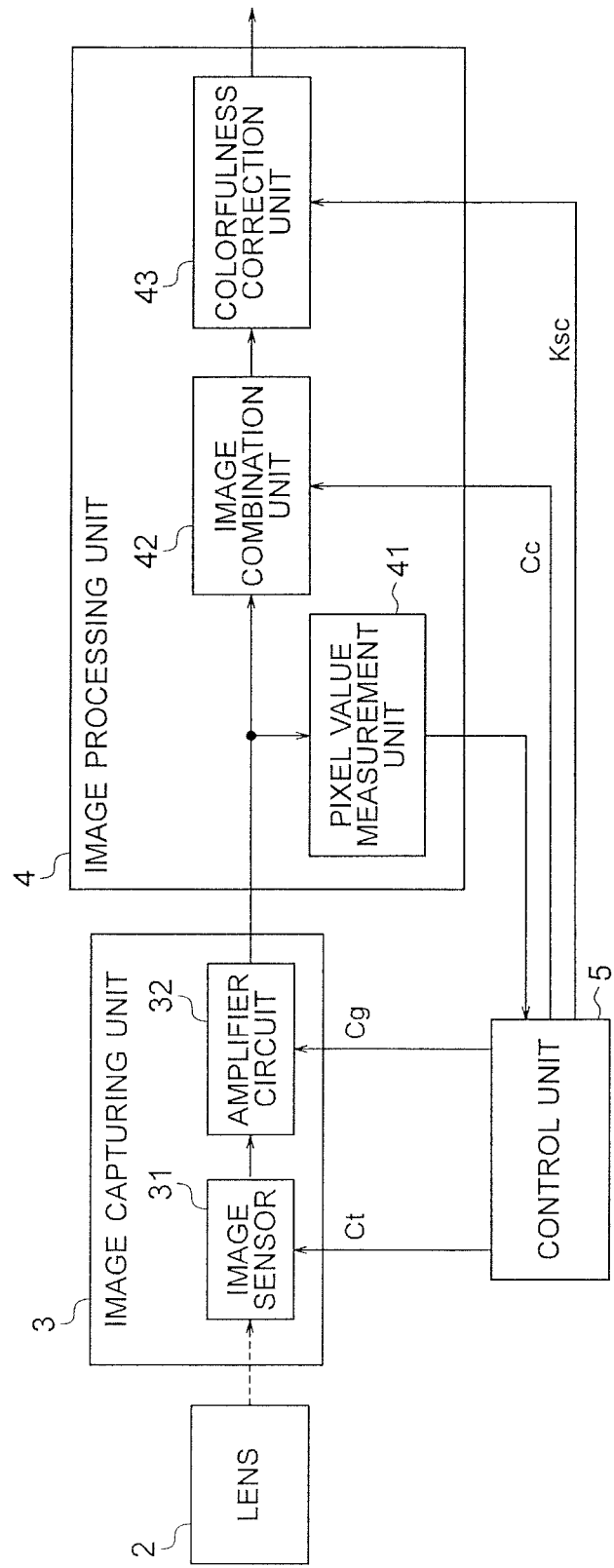
FIG. 11 is a block diagram illustrating an image processing device of a third embodiment of the present invention.

A configuration of the image capturing device for performing this process is illustrated in FIG. 11. In the configuration of FIG. 11, the image processing unit 4 includes a colorfulness correction unit 43.

The colorfulness correction unit 43 performs, to the wide dynamic range composite image, a process for correcting the colorfulness by multiplying colorfulness value by a correction coefficient.

For example, when the light exposure control is performed in the same way as described in FIGS. 6(a) and 6(b), the index values Se and Lb (FIGS. 6(a) and 6(b)) are acquired as the pixel values corresponding to the same cumulative frequency proportion (5%) in the short light exposure image and the long light exposure image, and a ratio Lb/Se of the index value Lb to the index value Se is calculated as a brightness ratio Qr.

When the light exposure control is performed as described with reference to FIGS. 7 to 8(b) with regard to the second embodiment, the predetermined value Sfs and the index value Lf (FIGS. 8(a) and 8(b)) are acquired as the pixel values corresponding to the same cumulative frequency proportion (5%) in the short light exposure image and the long light exposure image, and a ratio Lf/Sfs of the index value Lf to the predetermined value Sfs is calculated as the brightness ratio Qr.

When the light exposure control is performed as described with reference to FIGS. 9 to 10 (b) with regard to the second embodiment, the index value Sf and the predetermined value Lfs (FIGS. 10(a) and 10(b)) are acquired as the pixel values corresponding to the same cumulative frequency proportion (5%) in the short light exposure image and the long light exposure image, and a ratio Lfs/Sf of the predetermined value Lfs to the index value Sf is calculated as the brightness ratio Qr.

A colorfulness correction coefficient employed by the colorfulness correction unit 43 is switched according to the magnitude of the brightness ratio Qr calculated as described above.

When the brightness ratio Qr is a small value close to "1", decrease in colorfulness due to the combination of the short light exposure image and the long light exposure image is small, and thus the colorfulness correction coefficient Ksc is set to a small value close to "1".

Moreover, when the brightness ratio Qr is a large value, such as "8" and "16", the colorfulness correction coefficient Ksc is set to a large value, such as "2" and "4".

In summary, the colorfulness correction coefficient Ksc is set larger as the brightness ratio Qr is larger.

Correspondence between the values of the brightness ratios Qr and the colorfulness correction coefficients Ksc is determined in advance by a conversion table (look-up table) in which a correspondence relation of the values is set. As for a value of the brightness ratio Qr that does not exist in the look-up table, the value of the colorfulness correction coefficient may be decided by interpolation from the values of the colorfulness correction coefficients in the conversion table. The interpolation can be performed by nearest neighbor interpolation or linear interpolation, for example. In the nearest neighbor interpolation, a value of the colorfulness correction coefficient corresponding to a value of the brightness ratio that is closest to an input value of the brightness ratio Qr among the values of the brightness ratios in the conversion table is used as the value of the colorfulness correction coefficient Ksc corresponding to the input value of the brightness ratio Qr. In the linear interpolation, a value obtained by taking a weighted average of values of the colorfulness correction coefficients corresponding to a plurality of values of the brightness ratios that are close to an input value of the brightness ratio Qr among the values of the brightness ratios in the conversion table is used as the value of the colorfulness correction coefficient Ksc corresponding to the input value of the brightness ratio Qr.

As described above, the decrease in colorfulness in the high brightness part in the combination of the short light exposure image and the long light exposure image can be suppressed by setting the colorfulness correction coefficient Ksc according to the brightness ratio Qr.

In the above embodiment, the cumulative frequency or the cumulative frequency proportion from the low pixel value side is used in the generation of the index value, but the cumulative frequency or the cumulative frequency proportion from the high pixel value side may be used. It should be interpreted that the "cumulative frequency proportion" in the claims given below includes both of the cumulative frequency proportion from the low pixel value side and the cumulative frequency proportion from the high pixel value side.

Although in the above first embodiment the short light exposure image is generated in a certain frame and the long light exposure image is generated in the next frame, it is possible to generate the short light exposure image in a first part in one frame period and to generate the long light exposure image in a subsequent part.

Although the present invention has been described as the image processing device in the above, an image processing method performed by the above image processing device also constitutes part of the present invention.

In the first, second, and third embodiments in the above, each part (parts illustrated as functional blocks in the drawings) of the image processing device (including the image processing unit 4 and the control unit 5) is implemented by a processing circuit. The processing circuit may be dedicated hardware, and may be a CPU that executes a program stored in a memory.

For example, the functions of the parts of FIG. 1 or FIG. 11 may be implemented by individual processing circuits, and functions of a plurality of parts may be collectively implemented by a single processing circuit.

When the processing circuit is a CPU, the function of each part of the image processing device is implemented by software, firmware, or a combination of software and firmware. The software or the firmware is described as a program and is stored in a memory. The processing circuit implements the function of each unit by reading out and executing the program stored in the memory. That is, the image processing device includes a memory for storing programs for causing the functions of the parts illustrated in FIG. 1 or FIG. 11 to be executed as a result, when executed by the processing circuit. Moreover, it can be said that these programs cause a computer to execute the method or procedure of the process in the image processing method performed by the image processing device.

Incidentally, it is also possible to implement a part of the functions of the parts of the image processing device by dedicated hardware and to implement another part by software or firmware.

As described above, the processing circuit can implement the above functions by hardware, software, firmware, or a combination of these.

Figure 12:
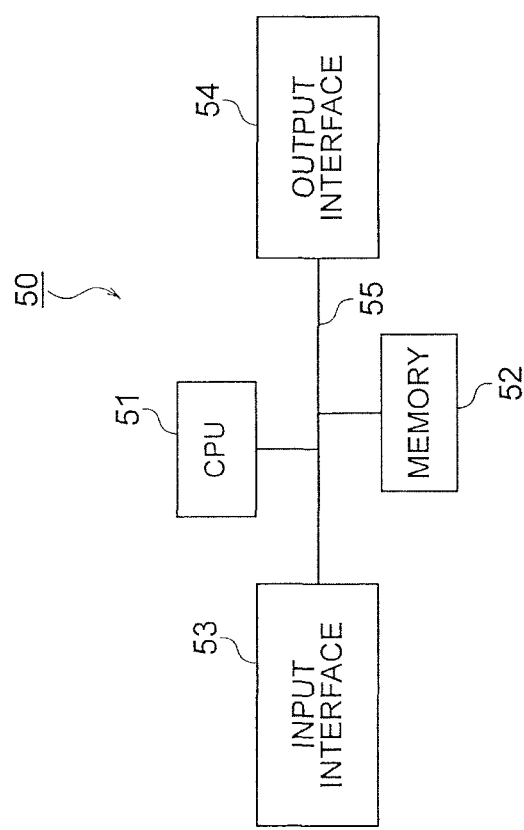
FIG. 12 is a block diagram illustrating a computer system that configures an image processing device of the first, second, or third embodiment.

FIG. 12 illustrates an example of a configuration in a case where the above processing circuit is a CPU and all the functions of the image processing device are implemented by a computer (denoted by a reference sign 50) including the single CPU.

A computer 50 illustrated in FIG. 12 includes a CPU 51, a memory 52, an input interface 53, and an output interface 54, and these are connected through a bus 55.

Image data from the image capturing unit 3 of FIG. 1 or FIG. 11 is input into the input interface 53. The image data contains image data representing the short light exposure image and image data representing the long light exposure image, and these are input alternately, for example alternately at respective frames.

The CPU 51 operates in accordance with the programs stored in the memory 52, and performs the process of each unit of the image processing device of the first, second, or third embodiment to a video signal input via the input interface 53, and outputs an output signal obtained as a result of the process from the output interface 54.

Detail of the process by the CPU 51 is the same as described in the first, second, or third embodiment. The data generated in the course of the process is retained in the memory 52.

With regard to the image processing method performed by the image processing device, and the program that causes the computer to execute the processes in the parts of the image processing device or the processes in the image processing method, the same effect as described regarding the image processing device is also obtained.

DESCRIPTION OF REFERENCE CHARACTERS

2 lens; 3 image capturing unit; 4 image processing unit; 5 control unit; 31 image sensor; 32 amplifier circuit; 41 pixel value measurement unit; 42 image combination unit; 43 colorfulness correction unit; 51 CPU; 52 memory; 53 input interface; 54 output interface.

What is claimed is:

1. An image processing device of an image capturing device that includes an image capturing unit that captures an image by receiving light from a subject, the image processing device comprising:
    a control unit that causes the image capturing unit to repeatedly and alternately perform image capturing with a first light exposure amount using a first light exposure time and image capturing with a second light exposure amount using a second light exposure time that is different from and longer than the first light exposure time, and to repeatedly and alternately output a first image generated by the image capturing with the first light exposure amount and a second image generated by the image capturing with the second light exposure amount;
    an image combination unit that generates a composite image by combining the first image and the second image; and
    a pixel value measurement unit that generates a histogram indicating an occurrence frequency of pixels of each pixel value in the first image and another histogram indicating another occurrence frequency of pixels of each pixel value in the second image,
    wherein the control unit
    generates a first index value as a pixel value at which a first cumulative frequency proportion obtained by dividing a cumulative frequency of the occurrence frequency of pixels of each pixel value up to the pixel value by a total number of pixels that compose the first image becomes a first reference value in the histogram of the first image, and controls the first light exposure amount so that a first target condition that the first index value has a predetermined relation with a predetermined first target value is satisfied, and
    generates a second index value as another pixel value at which a second cumulative frequency proportion obtained by dividing a cumulative frequency of the another occurrence frequency of pixels of each pixel value up to the another pixel value by a total number of pixels that compose the second image becomes a second reference value smaller than the first reference value in the another histogram of the second image, and controls the second light exposure amount so that a second target condition that the second index value has a predetermined relation with a predetermined second target value is satisfied.

2. The image processing device according to claim 1, wherein the predetermined relation with the first target value means that the first index value is equal to the first target value, and the predetermined relation with the second target value means that the second index value is equal to the second target value.

3. The image processing device according to claim 1, wherein the control unit generates a third index value as a pixel value at which the first cumulative frequency proportion becomes a predetermined third reference value, and controls the first light exposure amount so that a third target condition that the third index value has a predetermined relation with a predetermined third target value is satisfied.

4. The image processing device according to claim 3, wherein the control unit controls the first light exposure amount so that the first target condition and the third target condition are satisfied in order of priority determined in advance for the first target condition and the third target condition.

5. The image processing device according to claim 3, wherein the second reference value and the third reference value are same, the second light exposure amount is larger than the first light exposure amount, and the second target value and the third target value are determined so that a ratio of the second target value to the third target value is not more than an upper limit value of a ratio of the second light exposure amount to the first light exposure amount.

6. The image processing device according to claim 1, wherein the control unit generates a third reference value as a cumulative frequency proportion obtained by dividing a cumulative frequency of the occurrence frequency of pixels of each pixel value up to a predetermined pixel value by the total number of the pixels that compose the first image, from the histogram of the first image obtained as a result of the image capturing with the first light exposure amount, uses the third reference value as the second reference value, when generating the second index value from the another histogram of the second image obtained as a result of the image capturing with the second light exposure amount performed subsequent to the image capturing with the first light exposure amount, and determines the second target value so that a ratio of a larger one to a smaller one of the predetermined pixel value and the second target value is not more than an upper limit value of a ratio of a larger one to a smaller one of the first light exposure amount and the second light exposure amount.

7. The image processing device according to claim 4, wherein the first image and the second image are color images, the image processing device further comprises a colorfulness correction unit that corrects colorfulness by multiplying colorfulness value of the composite image by a correction coefficient, and the control unit increases the correction coefficient as a ratio of the second index value to the third index value is larger.

8. The image processing device according to claim 6, wherein the first image and the second image are color images, the image processing device further comprises a colorfulness correction unit that corrects colorfulness by multiplying colorfulness value of the composite image by a correction coefficient, and the control unit increases the correction coefficient as a ratio of a larger one to a smaller one of the predetermined pixel value and the second index value is larger.

9. An image processing method in an image capturing device that includes an image capturing unit that captures an image by receiving light from a subject, the image processing method comprising:

a control step of causing the image capturing unit to repeatedly and alternately perform image capturing with a first light exposure amount using a first light exposure time and image capturing with a second light exposure amount using a second light exposure time longer than the first light exposure time, and to repeatedly and alternately output a first image generated by the image capturing with the first light exposure amount and a second image generated by the image capturing with the second light exposure amount;

an image combination step of generating a composite image by combining the first image and the second image; and a pixel value measurement step of generating a histogram indicating an occurrence frequency of pixels of each pixel value in the first image and another histogram indicating another occurrence frequency of pixels of each pixel value in the second image, wherein the control step includes generating a first index value as a pixel value at which a first cumulative frequency proportion obtained by dividing a cumulative frequency of the occurrence frequency of pixels of each pixel value up to the pixel value by a total number of pixels that compose the first image becomes a first reference value in the histogram of the first image, and controlling the first light exposure amount so that a first target condition that the first index value has a predetermined relation with a predetermined first target value is satisfied, and generating a second index value as another pixel value at which a second cumulative frequency proportion obtained by dividing a cumulative frequency of the another occurrence frequency of pixels of each pixel value up to the another pixel value by a total number of pixels that compose the second image becomes a second reference value smaller than the first reference value in the another histogram of the second image, and controlling the second light exposure amount so that a second target condition that the second index value has a predetermined relation with a predetermined second target value is satisfied.

10. A non-transitory computer-readable recording medium that records a program for causing a computer to execute a process of the steps of the image processing method according to claim 9.

* * * * *